United States Patent [19]

Nakano

[11] Patent Number: 4,775,901
[45] Date of Patent: Oct. 4, 1988

[54] APPARATUS AND METHOD FOR PREVENTING UNAUTHORIZED DUBBING OF A RECORDED SIGNAL

[75] Inventor: Kenji Nakano, Kanagawa, Japan
[73] Assignee: Sony Corporation, Tokyo, Japan
[21] Appl. No.: 937,017
[22] Filed: Dec. 2, 1986
[30] Foreign Application Priority Data Dec. 4, 1985 [JP] Japan .................... 60-272995

[51] Int. Cl.$^4$ ............................ G11B 15/04
[52] U.S. Cl. ........................................ 360/60
[58] Field of Search ............... 360/60; 369/59; 380/4, 380/5

[56] References Cited

PUBLICATIONS

Minutes of the 6th General Meeting of the DAT Conference held 7/19/85.

Primary Examiner—Vincent P. Canney
Attorney, Agent, or Firm—Alvin Sinderbrand

[57] ABSTRACT

In a reproducing and recording or dubbing system there are provided a reproducing apparatus for reproducing from a first tape recorded composite data which includes pulse code modulated information data mixed with control data having first and second states for indicating that re-recording of the associated information data is to be prevented and permitted, respectively, a recording apparatus for recording on a second tape composite data reproduced from the first tape, a detector for detecting the states of the control data in the composite data reproduced from the first tape, a generator for generating a dubbing protect control signal in response to detection of the first state of the control data, a line for transmitting the reproduced composite data from the reproducing apparatus to the recording apparatus, and a switch interposed in the line for transmitting the reproduced composite data and being operated by the dubbing protect control signal to interrupt the transmission of the reproduced composite data to the recording apparatus and thereby prevent recording or copying of the reproduced composite data on the second tape.

4 Claims, 6 Drawing Sheets

FIG. 1

| | | | | | 44 BLOCKS | | | | 132 BLOCKS | | | | | 44 BLOCKS | | |
|---|---|---|---|---|---|---|---|---|---|---|---|---|---|---|---|---|
| | Sync | | | | | | | | | | | | | | | |
| | Address | | | | | | | | | | | | | | | |
| Q | $Q_0$ | $Q_1$ | $Q_2$ | ... | $Q_{43}$ | $Q_{44}$ | $Q_{45}$ | $Q_{46}$ | ... | $Q_{87}$ | $Q_{88}$ | $Q_{89}$ | $Q_{90}$ | ... | $Q_{131}$ | |
| $W_0$ | $ID_0$ | $ID_1$ | $L_0$ | ... | $R_{60}$ | $ID_2$ | $ID_3$ | $L_1$ | ... | $R_{87}$ | $ID_4$ | $ID_5$ | $L_2$ | ... | $R_{62}$ | |
| $W_1$ | $L_{63}$ | $R_{63}$ | | | $R_{126}$ | $L_{64}$ | $R_{64}$ | | | $R_{127}$ | $L_{65}$ | $R_{65}$ | | | $R_{128}$ | |
| $W_2$ | $L_{129}$ | | | | $R_{192}$ | $L_{130}$ | | | | $R_{193}$ | $L_{131}$ | | | | $R_{194}$ | |
| $W_3$ | $L_{195}$ | | | | $R_{258}$ | $L_{196}$ | | | | $R_{259}$ | $L_{197}$ | | | | $R_{260}$ | |
| P | $P_0$ | | | | $P_{43}$ | $P_{44}$ | | | | $P_{87}$ | $P_{88}$ | | | | $P_{131}$ | |
| $W_4$ | $L_{261}$ | | | | $R_{324}$ | $L_{262}$ | | | | $R_{325}$ | $L_{263}$ | | | | $R_{326}$ | |
| $W_5$ | $L_{327}$ | | | | $R_{390}$ | $L_{328}$ | | | | $R_{391}$ | $L_{329}$ | | | | $R_{392}$ | |
| $W_6$ | $L_{393}$ | | | | $R_{456}$ | $L_{394}$ | | | | $R_{457}$ | $L_{395}$ | | | | $R_{458}$ | |
| $W_7$ | $L_{459}$ | | | | $R_{522}$ | $L_{460}$ | | | | $R_{523}$ | $L_{461}$ | | | | $R_{524}$ | |
| | CRC CODE | | | | | | | | | | | | | | | |

FIG. 2

| SY | AD | $Q_0$ | $ID_0$ | $L_{63}$ | $L_{129}$ | $L_{195}$ | $P_0$ | $L_{261}$ | $L_{327}$ | $L_{393}$ | $L_{459}$ | CRC |
|---|---|---|---|---|---|---|---|---|---|---|---|---|

FIG. 3

| | $ID_0$ | $ID_1$ | $ID_2$ | $ID_3$ | $ID_4$ | $ID_5$ |
|---|---|---|---|---|---|---|
| | | | | | | CONTROL WORDS |
| $B_7$ | | | | | | 1: DUBBING PROTECT |
| $B_6$ | | | | | | $B_5, B_6$<br>1  0 : RECORD START<br>0  1 : RECORD END<br>1  1 : RECORDING PERIOD<br>0  0 : IGNORE THESE BITS |
| $B_5$ | MODE CODE WORDS | DATA CODE WORDS | | | | |
| $B_4$ | | | | | | CH2  1 : AUDIO<br>        0 : OTHER |
| $B_3$ | | | | | | CH1  1 : AUDIO<br>        0 : OTHER |
| $B_2$ | | | | | | $B_1, B_2$<br>0  0 : MONO<br>0  1 : STEREO<br>1  0 : BI-LINGUAL<br>1  1 : OTHER |
| $B_1$ | | | | | | |
| $B_0$ | | | | | | 1 : VALID<br>0 : INVALID |

APPARATUS AND METHOD FOR PREVENTING UNAUTHORIZED DUBBING OF A RECORDED SIGNAL

BACKGROUND OF THE INVENTION

1. Field of the Invention

This invention relates to the prevention of the unauthorized dubbing or pirating of a recorded signal.

2. Description of the Prior Art

As is disclosed in U.S. Pat. Nos. 4,163,253 and 4,100,575, it is known to protect against the unauthorized recording and reproducing of transmitted video signals. However, the conventional technology provided for such an anti-piracy system is not sufficiently reliable.

OBJECTS AND SUMMARY OF THE INVENTION

Accordingly, it is an object of this invention to provide an improved method and apparatus for preventing unauthorized dubbing, that is, reproduction of a recorded signal and recording thereof, and which can avoid the defects encountered with the prior art method and apparatus.

It is another object of this invention to provide a reproducing and recording system employing video tape recorders which incorporate anti-piracy devices.

According to one aspect of the present invention, there is provided, in a reproducing and recording system, the combination of: a reproducing apparatus for reproducing from a first tape recorded composite data which includes pulse code modulated information data mixed with control data having first and second states for indicating that re-recording of the associated information data is to be prevented and permitted, respectively; a recording apparatus for recording on a second tape composite data reproduced from said first tape; detecting means for detecting said states of said control data in said composite data reproduced from said first tape; means for generating a dubbing protect control signal in response to detection of said first state of said control data; means for transmitting said reproduced composite data from said reproducing apparatus to said recording apparatus; and switching means interposed in said means for transmitting and being operated by said dubbing protect control signal to interrupt the transmission of said reproduced composite data to said recording apparatus and thereby prevent recording of said reproduced composite data on said second tape.

In a preferred embodiment of the invention, the means for generating the dubbing protect control signal includes counting means for counting the number of times the control data is detected to be in said first state thereof, and means providing said dubbing protect control signal only when said counting means counts to a predetermined value.

In accordance with another aspect of this invention, a method for preventing the use of a reproducing apparatus combined with a recording apparatus for unauthorized dubbing of a recorded information signal comprises recording dubbing protection control data with the information signal to provide a recorded composite signal; reproducing the recorded composite signal in said reproducing apparatus; detecting the presence of said dubbing protection control data in the reproduced composite signal; and intercepting or inhibiting transmission of the reproduced composite signal from the reproducing apparatus to the recording apparatus in response to the detection of the dubbing protection control data in the reproduced composite signal, thereby preventing copying of the latter.

The above, and other objects, features and advantages of the present invention, will become apparent from the following detailed description of the invention that is to be read in conjunction with the accompanying drawings, throughout which the same reference numerals identify like elements and parts.

BRIEF DESCRIPTION OF THE DRAWINGS

FIGS. 6I and 6II together form a block diagram showing a practical circuit arrangement of the system of FIG. 4.

DESCRIPTION OF THE PREFERRED EMBODIMENTS

Figure 1:
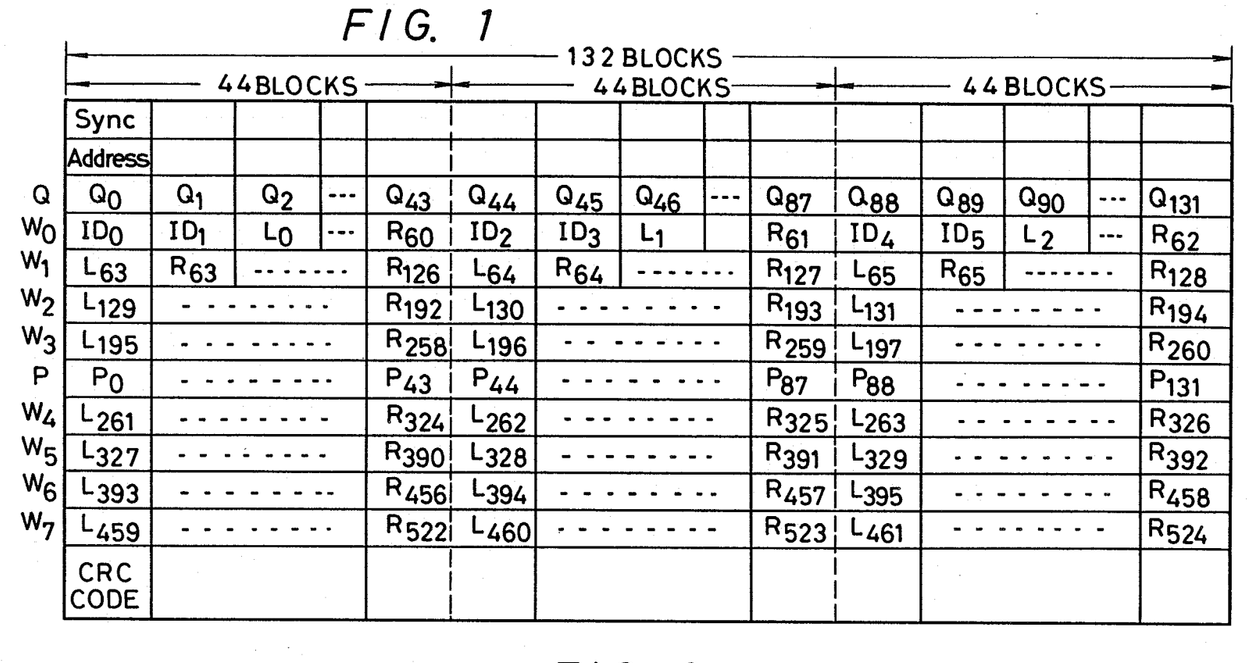
FIG. 1 is a diagrammatical representation of a data arrangement for one field of a digital audio signal that is desirably employed when applying the present invention to 8-mm VTRs.

It is now generally well known to use a so-called 8-mm video tape recorder (VTR) for recording on a magnetic tape, by means of a rotary head, a digital audio signal together with a video signal, or the digital audio signal alone in a so-called multi-PCM mode. FIG. 1 shows a data arrangement of one field of a digital audio signal, as disclosed in U.S. Pat. No. 4,562,578 having a common assignee herewith, and which is desirably employed when applying the present invention to such 8-mm VTR.

In the data arrangement of FIG. 1, one word consists of eight bits, specifically, n=8 words, m=132 bocks, and n×m=1056 words. The digital audio signal of one field in the NTSC system is 1050 words, so that, when the sampling frequency is $2f_h$ (where $f_h$ is the horizontal frequency), six words of control data ($ID_0$, $ID_1$ ... $ID_5$) must be added to the words in one field of the NTSC system, preferably at the beginning thereof. In other words, six words of control data are added to the digital audio signal in one field, which is sequential as follows: $L_0, R_0, L_1, R_1, R_2, \ldots L_{522}, R_{522}, L_{523}$ and $R_{523}$.

The 1056 words that include the control data $ID_0$ to $ID_5$ are arranged so that there is a distance of 44 blocks in the lateral direction at every two words, that is, two-by-two, such as, $ID_0$-$ID_1$, $ID_2$-$ID_3$, $ID_4$-$ID_5$, and so on. In a hardware implementation, this may be achieved by writing, at addresses separated by 44 blocks, in response to the address control of a random access memory (RAM). If the control data or parity data are separated, then two words $L_i$ and $R_i$ are arranged in the lateral direction or left to right direction in relation to FIG. 1. The reason the digital audio signal is interleaved by being divided into three in the lateral direction is that the correctable burst error length is thereby maximized, when using, for example, a mean-value interpolation. More particularly, by such lateral arrangement of Li and Ri, the correctable length can be made longer as compared with the case where they are arranged in the longitudinal direction or the up and down direction in FIG. 1.

Two parities, either odd or even, are added to the digital audio signal of one field that includes the control data. If the audio data series in each row of the above matrix structure is taken as $W_0, W_1, \ldots W_7$, a first parity series P having eight words in each data series is formed with a distance between such words of 14 blocks or 15 blocks in the lateral direction.

Moreover, nine words, each of which is taken from the audio data series $W_0$ to $W_7$ and the parity series P, form a second parity series Q with a distance of twelve blocks between adjacent elements. The first parity series P is positioned at the center of one block, while the second parity series Q is positioned at the end of the block. Since the probability is high that errors occurring in data at the center of the block will be impossible to correct, the parity series P is located at the center of the block, since it is less important than audio data, and the parity series Q is positioned at the end of the block in order to maximize the distance between successive words that form the parity series P.

Figure 2:
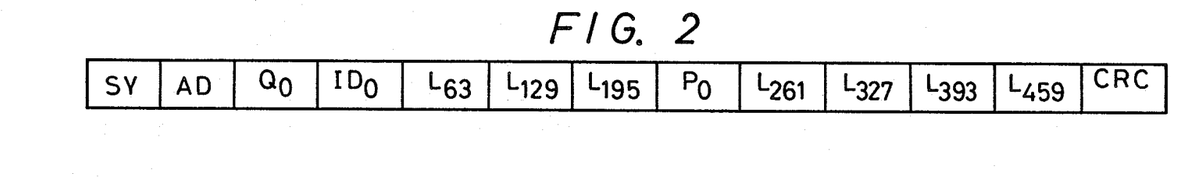
FIG. 2 is a diagrammatical representation of a block of the data included in the arrangement of FIG. 1.

Each group of 132 blocks include an eight-word digital audio signal, two-word parity data, and a cyclic redundancy check (CRC) code for error detection which may involve 16 bits added to the data of each block. A block synchronizing signal SY and a block address signal AD are also added to the group of blocks before it is recorded on a magnetic tape. If data of the first block is taken out of context and examined separately, it will appear as shown in FIG. 2, it being understood that after this block there will follow the second block, the third block, ... up to the 132d block, moving left to right in FIG. 1.

Figure 3:
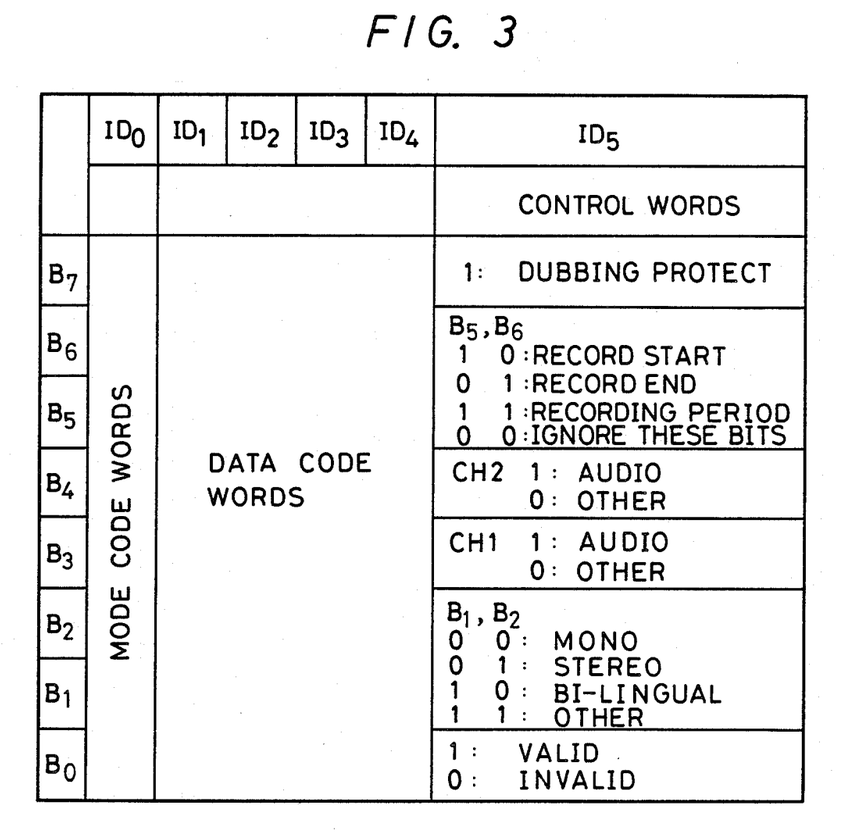
FIG. 3 is a chart to which reference will be made in explaining control word data provided according to this invention.

The six words of control data $ID_0$ to $ID_5$ will now be described with reference to FIG. 3. These control data words $ID_0$ to $ID_5$ are each formed of eight bits $B_0$ to $B_7$. The control data words $ID_0$ to $ID_4$ are allocated to utility word data. For example, word $ID_0$ may be a mode code and, on the basis of the value of such control data word $ID_0$, the words $ID_1$ to $ID_4$ are made to selectively represent a tape count or distance along the tape, a program number, the data and day of the week when recording is being effected, the hour, minute, second and frame of the recording, a table of contents and a control code for the multi-PCM mode.

The word $ID_5$ can express various kinds of control data by its several bits. First of all, in accordance with this invention, bit $B_7$ of word $ID_5$ represent the dubbing protect mode, for example, dubbing is to be prevented when bit $B_7$ is at a high level or "1". Bits $B_5$ and $B_6$ represent start and stop information, for example, as shown on FIG. 3, the record start point is indicated when bit $B_5$ is "1" and $B_6$ is "0", the record end point is indicated when $B_5$ is "0" and $B_6$ is "1", both bits $B_5$ and $B_6$ are "1" between the recording start and end points, and both bits $B_5$ and $B_6$ are "0" to indicate that these bits are to be ignored. Bits $B_3$ and $B_4$ represent the nature of information recorded in channels $CH_1$ and $CH_2$, respectively. For example, the bit $B_3$ or $B_4$ is "1" when the audio signals are recorded in the respective channel $CH_1$ or $CH_2$, and the bit $B_3$ or $B_4$ is "0" when the respective channel has other information signals recorded therein. Bits $B_1$ and $B_2$ indicate the recording mode, for example, as shown, monaural sound is recorded in both channels when $B_1$ and $B_2$ are both "0", stereo sound is recorded (L in channel $CH_1$ and R in channel $CH_2$) when $B_1$ is "0" and $B_2$ is "1", bi-lingual recording is effected when $B_1$ is "1" and $B_2$ is "0", with channel $CH_1$ receiving the main or basic sound and channel $CH_2$ receiving the secondary sound or translation, and other modes of recording are indicated when $B_1$ and $B_2$ are both "1". Finally, the bit $B_0$ indicates the validity or invalidity of all of the other bits $B_1$ to $B_7$ of word $ID_5$. For example, the following bits $B_1$ to $B_7$ are valid when $B_0$ is "1", and $B_0$ is "1" should be written at least once per second.

Accordingly, when the manufacturer of software tape produces a large number of slave tapes by copying from a master tape through the use of a printer such as a VTR, it is simple, when using the VTR, to dub the master tape so as to record "1" as the bit data $B_7$ of the control word $ID_5$. Thereafter, anyone else using an apparatus according to the present invention is preventing from pirating, that is, making an unauthorized recording, of either the master tape or slave tape in which the bit $B_7$ of word $ID_5$ is "1".

Figure 4:
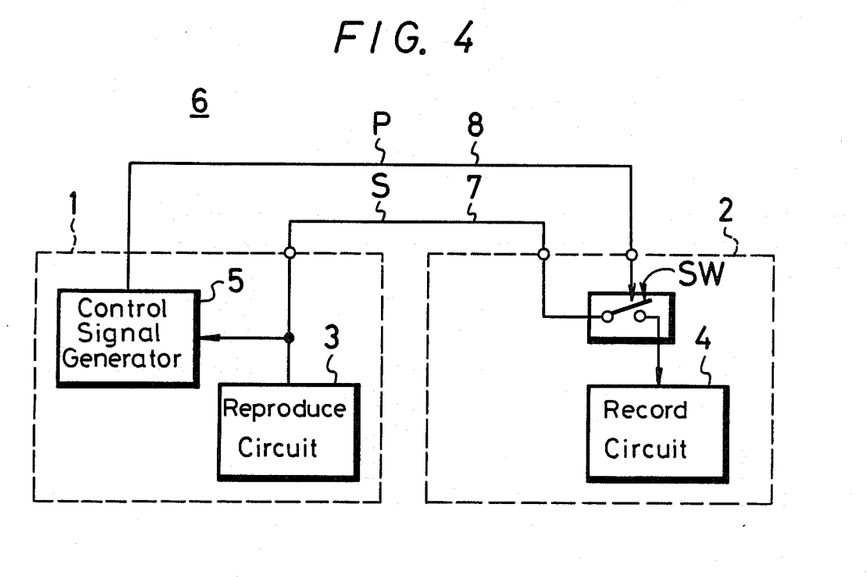
FIG. 4 is a block diagram showing a reproducing-recording system according to one embodiment of the present invention.

Referring now to FIG. 4, it will be seen that a copying or reproducing and recording system 6 according to one embodiment of this invention generally comprises video tape recorders (VTRs) 1 and 2 which are of the so-called 8-mm VTR-type and may be constructed integrally as a unitary structure or provided separately with the connecting cables. The VTR 1 is essentially a reproducing VTR and the VTR 2 is a recording VTR. The VTRs 1 and 2 may be provided with the same construction which includes a recording circuit and a reproducing circuit even though both of those circuits are not used in each VTR. In FIG. 4, only those circuit elements necessary for understanding the present invention have been illustrated. Thus, it will be understood that each of the VTRs 1 and 2 further includes a rotary magnetic head to record either a digital audio signal alone, or an audio signal together with a video signal, in oblique tracks on a magnetic tape and to reproduce the same from the magnetic tape.

The VTR 1 is shown to be provided with at least a reproducing circuit 3, while the VTR 2 is provided with at least a recording circuit 4. Further, the reproducing VTR 1 is provided with a dubbing protect control signal generating circuit 5. This circuit 5 is adapted to detect when bit $B_7$ of word $ID_5$ in a digital signal S reproduced by reproducing circuit 3 is "1", and, in response to the detected $B_7=1$, to generate a dubbing protect control signal P. The system 6 according to this invention further includes a switch SW, which in the embodiment of FIG. 4, is provided in the recording VTR 2 as a signal recording prevention circuit.

In the reproducing VTR 1, the digital audio signal and the video signal recorded on a master or other tape being played therein are reproduced by the rotary magnetic head and then fed to reproducing circuit 3. The reproduced digital audio signal alone or with the video signal are applied from reproducing circuit 3 through a transmission line 7 to the switch SW in VTR 2 and then to the recording circuit 4. The digital audio signal from recording circuit 4 is recorded in oblique tracks on a slave tape by the rotary magnetic head of VTR 2.

Further, the dubbing protect control signal P from dubbing protect control signal generating circuit 5 of reproducing VTR 1 is supplied through a transmission line 8 to switch SW in the recording VTR 2, and functions to control such switch SW. More specifically, in the dubbing protect control signal generating circuit 5, when bit $B_7=1$ in word $ID_5$ is detected, circuit 5 generates the dubbing protect control signal P which opens switch SW in VTR 2 so that the signal S reproducing by VTR 1 cannot reach recording circuit 4 in VTR 2 and hence cannot be recorded by the latter on a slave tape therein. On the other hand, whenever bit $B_7=0$ in word $ID_5$, switch SW remains in its normal closed condition so there is no interference with the recording by VTR 2 of the signal S reproduced in VTR 1.

Figure 5:
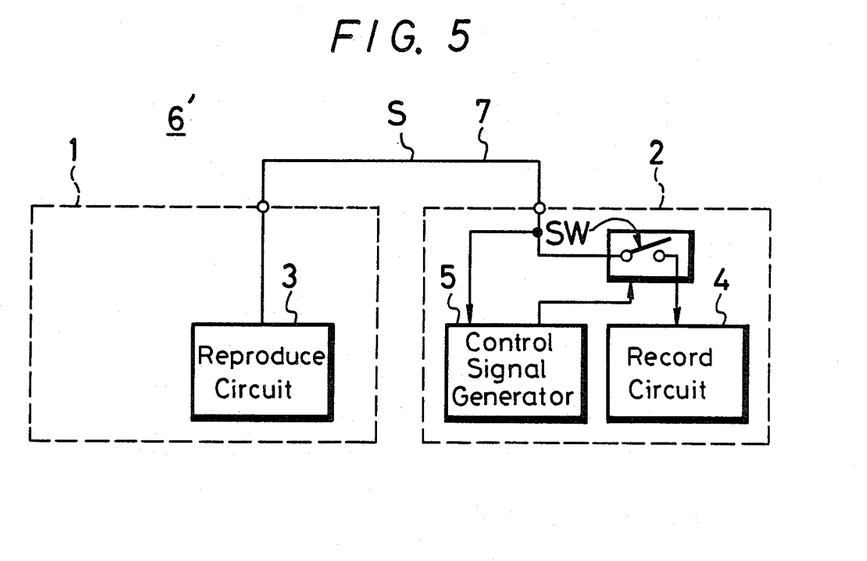
FIG. 5 is a block diagram showing a reproducing-recording system according to another embodiment of the present invention.

Alternatively, in an apparatus 6' according to another embodiment of this invention, the dubbing protect control signal generating circuit 5' may be provided in the recording VTR 2, as shown in FIG. 5. In this case, it is sufficient that only the transmission line 7 for the reproduced video and audio signals S is provided between VTRs 1 and 2 and the bit $B_7$ in word $ID_5$ is detected in the dubbing protect control signal generating circuit 5 in VTR 2. Once again, when the detected bit $B_7$ is "1", the resulting dubbing protect control signal P is applied to switch SW in VTR 2 to open the same and thereby prevent the reproduced signal S from reaching the recording circuit 4.

Figures 1, 6:
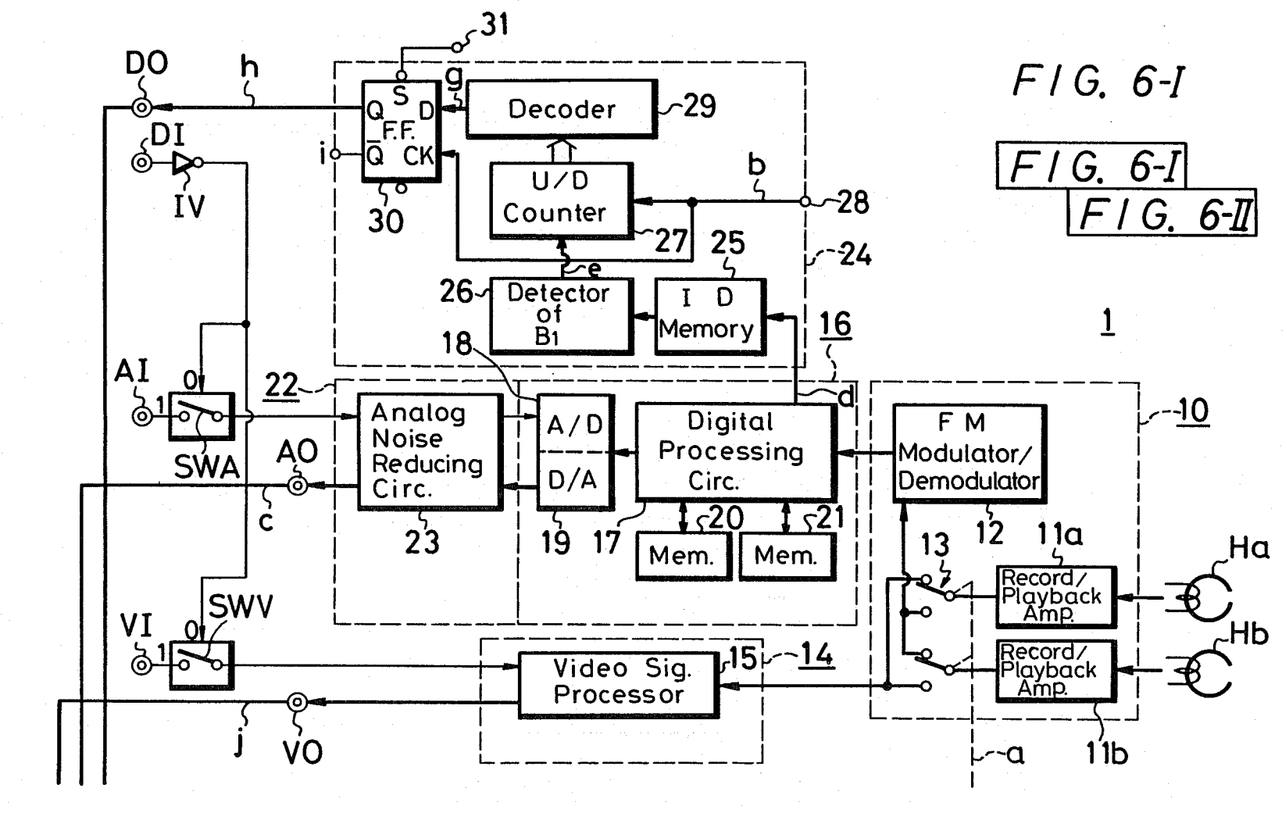
Figures 2, 6:
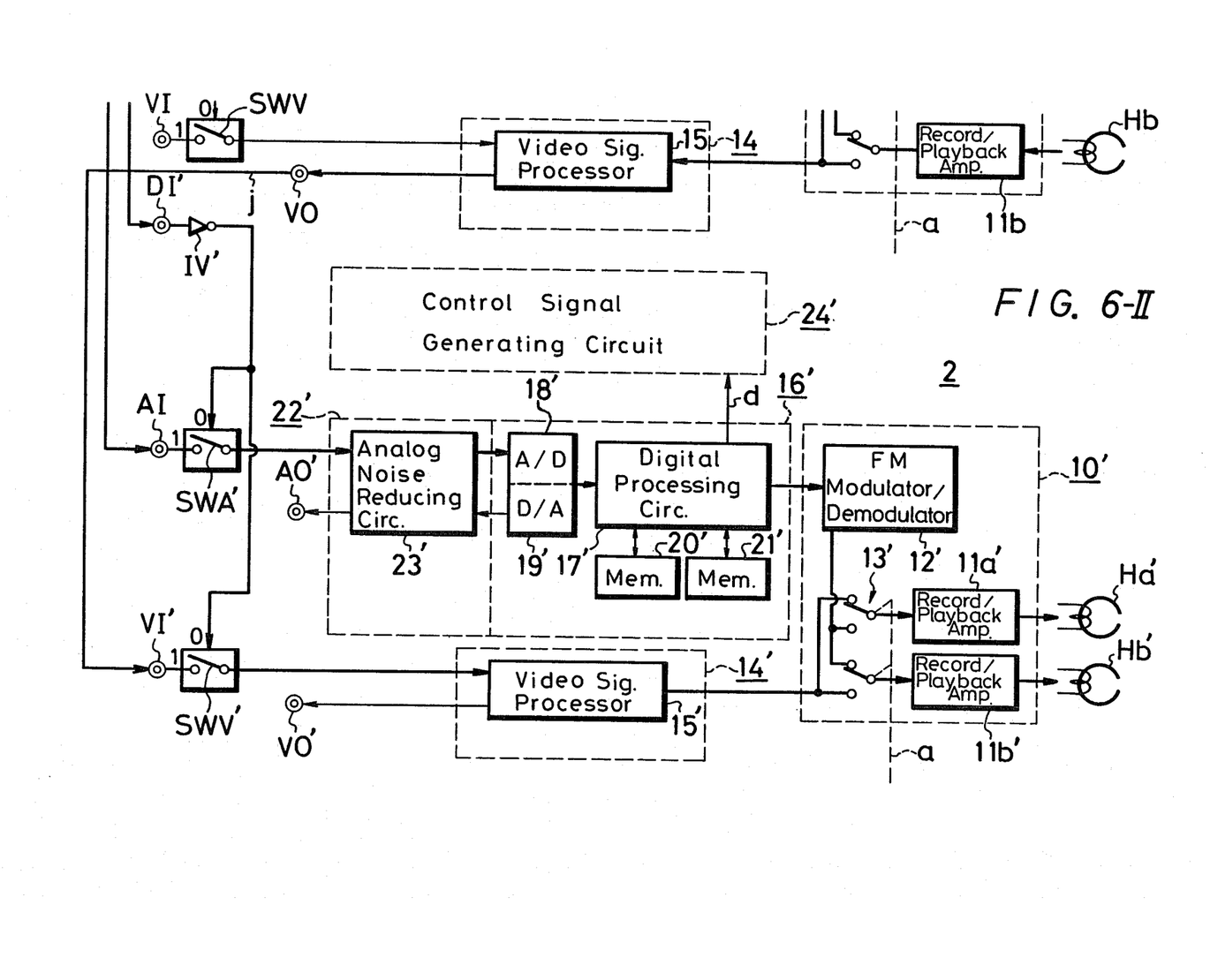

Referring now to FIGS. 6I and 6II which show, in greater detail, practical circuit arrangements for the master VTR 1 and the slave VTR 2 represented only generally on FIG. 4, it will be seen that the VTRs 1 and 2 may be similar with the parts of VTR 2 which correspond to those in VTR 1 being identified by the same reference numerals but with primes appended thereto. Further, only the connections between VTRs 1 and 2 drawn in bold or heavy lines are used when the system according to this invention is authorized to record in slave VTR 2 the signals being reproduced in master VTR 1.

In order that the roles of VTRs 1 and 2 may be reversed, that is, the VTR 1 may be used as a recording VTR and the VTR 2 used as a reproducing VTR, each of the VTRs 1 and 2 is provided with a dubbing protect control signal generating circuit 24 or 24' and a signal recording prevention circuit SWA,SWV or SWA',SWV' in addition to recording and reproducing circuits.

More specifically, as shown on FIG. 6I, master VTR 1 is provided with recording/reproducing rotary magnetic heads Ha and Hb. A recording/reproducing block 10 is provided with recording/reproducing amplifiers 11a and 11b and a recording/reproducing change-over switch 13. The rotary magnetic heads Ha and Hb are respectively connected to recording/reproducing amplifiers 11a and 11b which are, in turn, connected selectively through change-over switch 13 to an FM-modulator/demodulator 12 or a video signal processor circuit 15 in a video block 14. A switch signal a (FIG. 7A) is applied to head change-over switch 13 for controlling the latter. A video signal input terminal VI and a video signal output terminal VO are connected with video signal processor circuit 15.

A digital processor block 16 for processing an audio signal is shown to include a circuit 17 for effecting error correction, mean-value interpolation and 10-8 bit converting, an A/D (analog-to-digital) converter 18, a D/A (digital-to-analog) converter 19 and memories 20 and 21. The FM-modulator/FM-demodulator 12 is connected to the error correction mean-value interpolation/10-8 bit converting circuit 17 which is, in turn, connected with A/D converter 18, D/A converter 19 and memories 20 and 21.

A noise reduction block 22 is provided with an analog noise reduction circuit 23 which is connected to A/D converter 18 and D/A converter 19. An audio signal input terminal AI and an audio signal output terminal AO are connected with analog noise reduction circuit 23.

In accordance with this invention, VTR 1 is provided with a circuit 24 for generating a dubbing protect control signal, and which includes a control word data memory 25 connected to error correction/mean-value interpolation/10-8 bit converting circuit 17. The output read from memory 25 is supplied to a detection circuit 26 for detecting the bit data $B_7$ of control word $ID_5$. The output from detection circuit 26 is supplied to an up/down counter 27 which receives, as a clock signal, a field timing signal b (having a frequency of 60 Hz) from a terminal 28. A parallel output from counter 27 is supplied to a decoder 29. The output from decoder 29 is supplied to a D input terminal of a D flip-flop circuit 30 which also receives at its clock input terminal CK, the field timing signal b from terminal 28 and, at its set terminal S, a voltage relating to a power source voltage from a terminal 31. A dubbing control signal output terminal DO is led out of the non-inverting output terminal Q of flip-flop circuit 30.

On-off switches SWA and SWV are provided in VTR 1 to respectively interrupt the digital audio signal and the video signal when VTR 1 is used for recording. On-off switches SWA and SWV are respectively interposed between audio signal input terminal AI and analog noise reduction circuit 23 and between the video signal input terminal VI and video signal processor circuit 15.

The signal from a dubbing control signal input terminal DI is supplied through an inverter IV to switches SWA and SWV to control the opening and closing thereof. However, when the VTR 1 is used as the master VTR, as in the illustrated case, input terminals DI,AI and switches SWA,SWV are not used. As earlier noted, and as is apparent from FIG. 6II, VTR 2 includes all of the above described elements or parts of VTR 1 identified by the same reference numerals, but with primes appended thereto. However, in the illustrated case where VTR 2 is used as a slave VTR for recording on a second or slave tape signals reproduced from the master tape by VTR 1, dubbing control signal output terminal DO of VTR 1 is connected to dubbing control signal input terminal DI' of VTR 2, and audio and video output terminals AO and VO of VTR 1 are connected to the audio and video input terminal AI' and VI', respectively, of VTR 2.

Figures 7A, 7B, 7C:
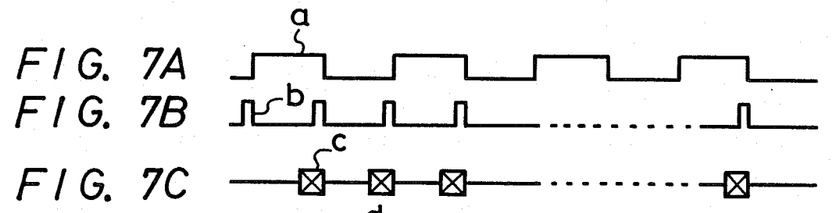
FIGS. 7A to 7J are timing charts to which reference will be made in explaining the operation of the system shown in FIGS. 6I and 6II.

The operation of the reproducing and recording system having the detailed circuit arrangements of FIGS. 6I and 6II, will now be described with reference to FIGS. 7A to 7J. More particularly, FIG. 7A shows a switching signal a having the frequency of 30 Hz and which is used to control head change-over switch 13. FIG. 7B shows a field timing signal b having the frequency of 60 Hz and which is applied to terminal 28. This field timing signal b is synchronized with the switching signal a shown in FIG. 7A. FIG. 7C represents a reproduced digital audio signal c that is obtained from audio signal output terminal AO of the reproducing or master VTR 1.

Figure 7D:
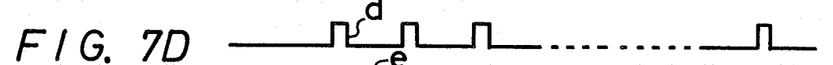
Figure 7E:
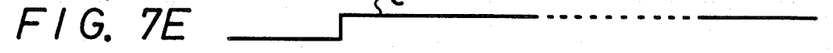
Figure 7F:
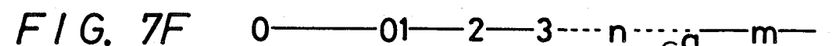
Figure 7G:
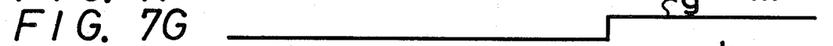
Figure 7H:
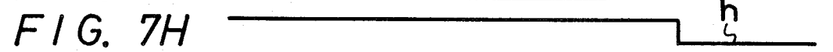
Figure 7I:
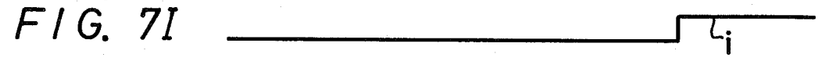

As in the embodiment described earlier with reference to FIG. 4, the digital audio signal and the control word data recorded on the master tape are reproduced by reproducing VTR 1. The control or identification word data d (FIG. 7D) in the reproduced signal is stored in ID memory 25 of VTR 1. If the bit data $B_7$ of the control word $ID_5$ in the control word data stored in ID memory 25 is "1" (that is, at a high level), this fact is detected by detecting circuit 26. As a result of the foregoing, circuit 26 provides a detected output e (FIG. 7E) to an enable input terminal of counter 27. The enabled counter 27 starts counting the field timing signal b and the counted value thereof is changed in the order of 0,1,2, ... n, ... m, as shown in FIG. 7F. The counted value of counter 27 is decoded by decoder 29. When the decoded value becomes larger than n (n is an integer of sufficiently large value), that is, when bit $B_7$ of word $ID_5$ has been detected to be "1" for a predetermined number n of field periods, decoder 29 generates an output g (FIG. 7G) which is fed to the D input terminal of flip-flop circuit 30. The reason counter 27 is made to count the field timing signal b more than n times before decoder 29 generates output g, is to ensure that bit data $B_7$ will not be erroneously detected by circuit 24 due to noise or the like. Flip-flop 30 is set by the voltage applied to terminal 31 each time the power switch of VTR 1 is turned ON. Consequently, the non-inverting output h and the inverting output i, from terminal Q and $\bar{Q}$, respectively, of flip-flop circuit 30 are reversed in level, as shown in FIGS. 7H and 7I, when bit $B_7$ of word $ID_5$ is detected to be "1" for a predetermined time. The output h, which constitutes the dubbing protect control signal (FIG. 7H) is derived at dubbing protect control signal output terminal DO of VTR 1 and is supplied therefrom to input terminal DI' of recording VTR 2 (FIG. 6II). From input terminal DI', the dubbing protect control signal h is applied through inverter IV' to switches SWA' and SWV', as a switch control signal therefor. It will be seen that, due to inverter IV', the switch control signal changes over from "0" to "1" in response to the detection of $B_7$="1" in $ID_5$ for a predetermined number n of field intervals, and, accordingly, switches SWA' and SWV' are changed-over to their OFF or opened conditions, as shown on FIG. 6II.

Figure 7J:
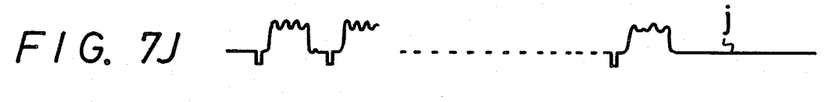

Accordingly, the digital audio signal c (FIG. 7C) and the video signal j (FIG. 7J) are not supplied to the analog noise reduction circuit 23 and the video signal processor circuit 15' of recording VTR 2. As a result, the digital audio signal (including the control word data) reproduced from the master tape by the reproducing VTR 1 can not be recorded on the slave tape by the recording VTR 2 in the dubbing record mode. Similarly, the video signal can not be recorded in the dubbing record mode.

Of course, if bit $B_7$ of control word $ID_5$ is detected by detector 26 to be "0", counter 27 is not enabled and does not count the clock signal b at the field frequency so that the output g from decoder 29 remains low and does not trigger flip-flop 30. In that case, the dubbing protect control signal h obtained at the Q output of flip-flop 30 remains high. Such dubbing protect control signal applied to input terminal DI of the recording VTR 2 causes switches SWA' and SWV' to remain in their closed or ON positions with the result that the digital audio signal and the video signal being reproduced in VTR 1 can be recorded on the slave tape by VTR 2 in the dubbing record mode of the system. Thus, the status of bit B7 of the control word $ID_5$ recorded on the master tape determines whether or not the associated digital audio signal, or the associated digital audio signal and video signal, can be recorded on the slave tape in the dubbing record mode of the system.

Although the dubbing protect control data is the bit $B_7$ of word $ID_5$ in the above-described embodiment, the dubbng protect control data may be any part of the digital signal, the analog signal, the video signal, the audio signal or the data signal, but it is desirable to use data mixed into a portion of the arbitrary PCM data as at least the control data. For example, this invention can be applied to a so-called multi-segment PCM VTR which employs a VTR having an 8-mm format as an apparatus for recording and reproducing only a PCM audio signal.

By way of summary, it will be seen that, in accordance with the present invention as set forth above, it is possible to positively prevent dubbing of a magnetic tape on which information data and control data including the dubbing protect control data are recorded.

Although illustrative embodiments of the invention have been described above with reference to the drawings, it will be apparent that the invention is not limited to those precise embodiments, and that many modifications and variations could be effected therein by one skilled in the art without departing from the spirit or scope of the invention as defined by the appended claims.

What is claimed is:

1. In a reproducing and recording system, the combination of:
    a reproducing apparatus for reproducing, from a first tape, recorded composite data which includes field arrangements of pulse code modulate information data mixed with control data for each field which has first and second states for indicating that re-recording of the associated information data is to be prevented and permitted, respectively;
    a recording apparatus for recording on a second tape composite data reproduced from said first tape;
    detecting means for detecting said states of said control data in said composite data reproduced from said first tape;
    means for generating a dubbing protect control signal, including counting means for counting the number of successive fields of the reproduced composite data in which the respective control data are detected to be in said first state thereof, and means providing said dubbing protect control signal only when said counting means counts to a predetermined value substantially greater than one;
    means for transmitting said reproduced composite data from said reproducing apparatus to said recording apparatus; and
    switching means interposed in said means for transmitting and being operated by said dubbing protect control signal to interrupt the transmission of said reproduced composite data to said recording apparatus and thereby prevent recording of said reproduced composite data on said second tape.

2. The reproducing and recording system according to claim 1; in which said detecting means and said means for generating the dubbing protect control signal are provided in said reproducing apparatus, and said switching means is provided at the end of said means for transmitting in said recording apparatus.

3. The reproducing and recording system according to claim 2; further comprising second means for transmitting said dubbing protect control signal from said reproducing apparatus to said switching means in said recording apparatus.

4. The reproducing and recording system according to claim 1; in which said detecting means, said means for generating the dubbing protect control signal and said switching means are provided in said recording apparatus.

* * * * *